United States Patent
Terada et al.

(10) Patent No.: US 7,570,478 B2
(45) Date of Patent: Aug. 4, 2009

(54) BINDER FOR ELECTRIC DOUBLE LAYER CAPACITOR

(75) Inventors: Kazuyo Terada, Tokyo (JP); Hidekazu Mori, Tokyo (JP)

(73) Assignee: Zeon Corporation, Tokyo (JP)

( * ) Notice: Subject to any disclaimer, the term of this patent is extended or adjusted under 35 U.S.C. 154(b) by 239 days.

(21) Appl. No.: 10/580,273

(22) PCT Filed: Nov. 26, 2004

(86) PCT No.: PCT/JP2004/017621

§ 371 (c)(1),
(2), (4) Date: May 25, 2006

(87) PCT Pub. No.: WO2005/052968

PCT Pub. Date: Jun. 9, 2005

(65) Prior Publication Data

US 2007/0091544 A1  Apr. 26, 2007

(30) Foreign Application Priority Data

Nov. 28, 2003 (JP) .............................. 2003-400567
Dec. 3, 2003 (JP) .............................. 2003-405133

(51) Int. Cl.
*H01G 9/00* (2006.01)
(52) U.S. Cl. ..................................... 361/502; 361/503
(58) Field of Classification Search ......... 361/502–503; 29/25.03
See application file for complete search history.

(56) References Cited

U.S. PATENT DOCUMENTS

| 4,327,400 | A * | 4/1982 | Muranaka et al. ............ 361/502 |
| 6,525,923 | B2 * | 2/2003 | Ishikawa et al. ............. 361/508 |
| 7,099,142 | B2 * | 8/2006 | Otsuki et al. ................. 361/502 |
| 2002/0034686 | A1 * | 3/2002 | Yamakawa et al. .......... 429/217 |
| 2003/0113626 | A1 | 6/2003 | Maeda et al. |
| 2005/0064096 | A1 * | 3/2005 | Kurihara et al. .............. 427/215 |

FOREIGN PATENT DOCUMENTS

| JP | 04233209 A * | 8/1992 |
| JP | 6-196364 A | 7/1994 |
| JP | 9-289142 A | 11/1997 |
| JP | 11-162794 A | 6/1999 |
| JP | 2000040504 A * | 2/2000 |
| JP | 2003-151560 A | 5/2003 |
| WO | WO-98/39808 A1 | 9/1998 |

* cited by examiner

*Primary Examiner*—Eric Thomas
(74) *Attorney, Agent, or Firm*—Birch, Stewart, Kolasch & Birch, LLP

(57) ABSTRACT

The present invention provides a binder for an electric double layer capacitor comprising; a polymer (A) containing an acrylate monomer unit, and having two or more glass transition temperatures; a composition for the electric double layer capacitor containing this binder and an active material for an electrode; an electrode for the electric double layer capacitor in which this composition is layered on a current collector, so as to exhibit excellent heat resistance and flexibility and a high binding force between the active material for the electrode and the current collector; and an electric double layer capacitor comprising this electrode, so as to exhibit a large electrostatic capacity and a small internal resistance.

12 Claims, No Drawings

BINDER FOR ELECTRIC DOUBLE LAYER CAPACITOR

TECHNICAL FIELD

The invention relates to a binder for an electric double layer capacitor for producing an electrode for an electric double layer capacitor, a composition for an electric double layer capacitor containing this binder, an electrode for an electric double layer capacitor produced by use of this composition, a method for producing this electrode, and an electric double layer capacitor having this electrode, more specifically, an electrode for an electric double layer capacitor which has an excellent heat resistance and a high binding force between its active material for an electrode and its current collector, a binder and a composition for producing this electrode, and a method for producing this electrode.

BACKGROUND ART

In recent years, with the development of electronic instruments, it has been desired to develop small-sized, light electrochemical devices which have a high energy density and can be repeatedly charged or discharged. In particular, the use of electric double layer capacitors which have a long lifetime and can give a large electric current has been increasing by making use of advantages thereof.

Demands for electric double layer capacitors, in which an electric double layer formed in an interface between a polarizable electrode and an electrolyte is utilized, as backup power sources have been rapidly increasing in recent years. Attention has been paid to the application thereof to articles for which a large capacity is required, such as a power source for an electric vehicle.

In order to obtain an electrode for an electric double layer capacitor, there is used a binder such as a polytetrafluoroethylene, a phenol resin, cellulose or water glass. The electrode obtained by use of these binders is insufficient in binding force between its active material for an electrode and its current collector since the electrode is poor in flexibility. In the case of using a conventional acrylic resin or polyvinyl alcohol as the binder, the resin covers the surface of activated carbon, which is an active material for an electrode, and the resin itself is easily dissolved in an electrolytic solution. It is therefore impossible to keep the binding force between the activated carbon and the current collector sufficiently. For this reason, the electric resistance in the resultant electrode becomes high and the electrostatic capacity of the resultant electric double layer capacitor is low.

Suggested is also a method for improving the capacity of an electrode obtained by use of a binder containing a styrene-butadiene copolymer (Patent Document 1). However, when this binder is used to apply activated carbon onto a current collector and then the resultant is dried at high temperature to remove water content therefrom, the flexibility of the electrode is lost so that the activated carbon falls off easily from the current collector. Consequently, a highly-reliable electrode for an electric double layer capacitor cannot be obtained. Patent Document 1: Japanese Patent Application Laid-Open No. 11-162794

DISCLOSURE OF THE INVENTION

Problems to be Solved by the Invention

Thus, an object of the present invention is to provide an electric double layer capacitor having a large electrostatic capacity and a small internal resistance; an electrode for an electric double layer capacitor that is excellent in heat resistance and flexibility in which the binding force between its active material for an electrode and its current collector is high; and a binder and a composition for an electric double layer capacitor for producing an electrode for an electric double layer capacitor.

The present inventors have found out that the above-mentioned problems can be solved by using a binder comprising a polymer having an acrylate monomer unit and having two or more glass transition temperatures. On the basis of this finding, the present invention has been made.

Means for Solving the Problems

Thus, according to the invention, the following (1) to (6) are provided.

(1) A binder for an electric double layer capacitor, comprising;

a polymer (A), containing an acrylate monomer unit, and having two or more glass transition temperatures.

The polymer (A) is preferably a complex.

The complex is a product in which two or more objects are combined and integrated with each other. Specific examples of the form thereof include a core-shell structure, a side-by-side structure, a potbellied structure, and an octopus-like structure. Among these, the core-shell structure is preferred.

The complex is preferably made of fine particles each having a core-shell structure obtained by polymerizing stepwise a monomer mixture containing an acrylate monomer.

(2) A composition for an electric double layer capacitor, containing the binder as recited in the item (1), and an active material for an electrode.

Preferably, the composition for the electric double layer capacitor further contains an electroconductivity additive.

Preferably, the composition for the electric double layer capacitor further contains water.

(3) A method for producing the composition for an electric double layer capacitor as recited in the item (2), wherein;

a binder for an electric double layer capacitor comprising the polymer (A) and an active material for an electrode are mixed with each other in a solvent to yield a dispersion, and the dispersion is granulated by spray drying method.

(4) An electrode for an electric double layer capacitor, wherein the composition for the electric double layer capacitor as recited in the item (2) is stacked on a current collector.

(5) A method for producing the electrode for the electric double layer capacitor as recited in the item (4), comprising the steps of:

applying, onto a current collector, a composition for an electric double layer capacitor containing a binder for the electric double layer capacitor comprising the polymer (A), an active material for an electrode, and water, and;

then drying the composition, thereby forming an electrode layer on the current collector.

(6) A method for producing the electrode for an electric double layer capacitor as recited in the item (4), comprising the steps of:

dry-molding the composition for the electric double layer capacitor containing the binder for the electric double layer capacitor comprising the polymer (A), and the active material for an electrode, and;

then forming an electrode layer on the current collector.

(7) An electric double layer capacitor, comprising the electrode as recited in the item (4), an electrolytic solution, and a separator.

Effects of the Invention

The use of the binder of the invention for an electric double layer capacitor makes it possible to yield an electrode for an electric double layer capacitor that is excellent in heat resistance and flexibility in which the binding force between its active material for an electrode and its current collector is high. The use of this electrode for an electric double layer capacitor makes it possible to produce an electric double layer capacitor which has a large electrostatic capacity, a small internal resistance, and an excellent reliability.

BEST MODE FOR CARRYING OUT THE INVENTION (1) Binder for an electric double layer capacitor The binder of the invention for an electric double layer capacitor comprises a polymer (A) containing an acrylate monomer unit and having two or more glass transition temperatures.

The polymer (A) is a polymer comprising an acrylate based monomer unit. The acrylate monomer unit can be produced by polymerizing an acrylate based monomer.

The acrylate monomer is an acrylate or methacrylate represented by the following general formula (1):

$CH_2=CR^1—COOR^2$. 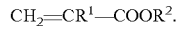

In the general formula (1), $R^1$ represents a hydrogen atom or a methyl group, and $R^2$ represents an alkyl group, which may be a cycloalkyl group. The number of carbon atoms in the alkyl group represented by $R^2$ is not particularly limited, and is preferably from 1 to 18, more preferably from 3 to 14, in particular preferably from 4 to 12.

When $R^1$ is a hydrogen atom, the formula (1) represents an acrylate. Specific examples thereof include methyl acrylate, ethyl acrylate, propyl acrylate, isopropyl acrylate, n-butyl acrylate, isobutyl acrylate, t-butyl acrylate, n-pentyl acrylate, isopentyl acrylate, n-hexyl acrylate, 2-ethylhexyl acrylate, nonyl acrylate, lauryl acrylate, stearyl acrylate, and isobornyl acrylate.

When $R^1$ is a methyl group, the formula (1) represents a methacrylate. Specific examples thereof include methyl methacrylate, ethyl methacrylate, propyl methacrylate, isopropyl methacrylate, n-butyl methacrylate, isobutyl methacrylate, t-butyl methacrylate, n-pentyl methacrylate, isopentyl methacrylate, n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate. Among these, n-butyl acrylate and 2-ethylhexyl acrylate are particularly preferred. These acrylate monomers may be used alone or in combination of two or more thereof. The amount of the acrylate monomer is not particularly limited, and is usually 10% or more by weight, preferably 50% or more by weight of all the monomers used for polymerization (100% by weight).

The polymer (A) is preferably a polymer in which a polyfunctional unsaturated monomer, besides the acrylate monomer, is copolymerized. The polyfunctional unsaturated monomer is a compound having two or more non-conjugated carbon-carbon double bonds. Specific examples thereof include dimethacrylates such as ethylene glycol dimethacrylate, diethylene glycol dimethacrylate, 1,3-butylene glycol dimethacrylate, and polyethylene glycol dimethacrylate; diacrylates such as diethylene glycol diacrylate, 1,3-butylene glycol diacrylate, tripropylene glycol diacrylate, 1,4-butanediol diacrylate, neopentylglycol diacrylate, 1,6-hexanediol diacrylate, 1,9-nonanediol diacrylate, and polyethylene glycol diacrylate; divinyl compounds such as divinylbenzene; non-conjugated dienes such as 1,5-hexadiene, 1,6-heptadiene, 1,7-octadiene, dicyclopentadiene, and 5-ethylidene-2-norbornene; and other bifunctional unsaturated compounds; and trimethacrylates such as trimethylolpropane trimethacrylate; triacrylates such as trimethylolpropane triacrylate; and other trifunctional unsaturated compounds. The amount of the polyfunctional unsaturated monomer is preferably from 0.5 to 10% by weight, in particular preferably from 1 to 5% by weight of all the monomers used for polymerization (100% by weight).

The polymer (A) is preferably a polymer in which an unsaturated carboxylic acid is further copolymerized. Examples of the unsaturated carboxylic acid include unsaturated monocarboxylic acids such as acrylic acid, methacrylic acid, crotonic acid, and isocrotonic acid; and unsaturated dicarboxylic acids such as maleic acid, fumaric acid, citraconic acid, mesaconic acid, glutaconic acid, and itaconic acid. Among these, unsaturated monocarboxylic acids are preferred, and acrylic acid or methacrylic acid is in particular preferred. In the polymer (A), the unsaturated carboxylic acid is copolymerized, whereby the binding force between an active material for an electrode and a current collector can be made high in electrode. The amount of the unsaturated carboxylic acid is preferably 2% or less by weight of all the monomers used for polymerization (100% by weight).

In the polymer (A), another monomer may be copolymerized as long as the effects of the invention are not spoiled. Examples of the different copolymerizable monomer include acrylates having a functional group, such as hydroxyethyl acrylate, hydroxypropyl acrylate, hydroxybutyl acrylate, and dimethylaminoethyl acrylate; methacrylates having a functional group, such as hydroxypropyl methacrylate, dimethylaminoethyl methacrylate, diethylaminoethyl methacrylate, methoxypolyethylene glycol monomethacrylate, and benzyl methacrylate; crotonates such as methyl crotonate, ethyl crotonate, propyl crotonate, butyl crotonate, isobutyl crotonate, n-pentyl crotonate, isopentyl crotonate, n-hexyl crotonate, 2-ethylhexyl crotonate, and hydroxylpropyl crotonate; maleic acid diesters such as dimethyl maleate, dibutyl meleate, and di-2-ethylhexyl maleate; fumaric acid diesters such as dimethyl fumarate, and dibutyl fumarate;

itaconic acid diesters such as dimethyl itaconate and dibutyl itaconate; unsaturated dicarboxylic acid anhydrides such as maleic anhydride, citraconic anhydride, and itaconic anhydride; acrylamides such as acrylamide and methacrylamide; aromatic vinyl monomers such as styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene, and vinylnaphthalene; acyclic olefin monomers such as ethylene, propylene and 1-butene; cyclic olefin monomers such as cyclopentene, and 2-norbornene; and conjugated dienes such as 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, and 3-butyl-1,3-octadiene. These may be used alone or in combination of two or more thereof.

The polymer (A) has two or more glass transition temperatures. The glass transition temperature is a value obtained by measurement with a differential scanning calorimeter (DSC) with a rise in temperature at 5° C. per minute. The number of the glass transition temperatures is usually from 2 to 4, preferably from 2 to 3, even more preferably 2.

About ranges of the glass transition temperatures, it is usually preferred that at least one of lower temperatures thereof is lower than 0° C. and at least one of higher temperatures thereof is 0° C. or higher. About one or more temperature differences between the glass transition temperatures, it is preferred that one or more combinations having a difference of 20° C. or higher are present. It is more preferred that one or more combinations having a difference of 50° C. or higher are present. When a polymer containing an acrylate monomer unit is used as a binder, the following tendency is generated: when the glass transition temperature of the polymer is high, the formability thereof is excellent in the production of an electrode therefrom and thus the electrode easily becomes homogenous while the polymer is easily dissolved or swelled in an electrolytic solution; and when the glass transition temperature is low, the resultant electrode is excellent in flexibility while particles therein aggregate easily. Accordingly, if the glass transition temperature is too high or too low, in the resultant electrode the binding force between its active material for an electrode and its current collector may lower. According to the invention, the polymer (A) has two or more glass transition temperatures, whereby the following can be balanced at a high level: good formability in the production of an electrode; the binding force between an active material for an electrode and a current corrector in the produced electrode; and the flexibility of the electrode.

The polymer (A) is preferably a polymer obtained by polymerizing two or more monomers which can give polymers having different glass transition temperatures, out of the above-mentioned monomers, stepwise. Specifically, the polymer (A) is preferably obtained by polymerizing a monomer which can be polymerized to give a polymer having a lower glass transition temperature than 0° C. in a first stage and polymerizing a monomer which can be polymerized to give a polymer having a glass transition temperature of 0° C. or higher in a second stage. The monomer used in each of the stages may be a mixture of monomers which can be polymerized to give a copolymer having a desired glass transition temperature in each of the stages. The acrylate monomer used in the first stage is preferably 2-ethylhexyl acrylate or n-butyl acrylate. The acrylate monomer used in the second stage is preferably methyl methacrylate or ethyl methacrylate.

The method for producing the polymer (A) is not particularly limited. For example, the polymer can be obtained by polymerizing each of the above-mentioned monomers by a known polymerization method such as emulsion polymerization, suspension polymerization, dispersion polymerization, or solution polymerization. It is particularly preferred to produce the polymer (A) by emulsion polymerization since the particle diameter of the polymer (A) can easily be controlled. According to the emulsion polymerization, the polymer (A) can be obtained as an aqueous dispersion.

The polymer (A) is preferably a complex. The complex is a product in which two or more polymers are combined and integrated with each other. Specifically, the complex is made of single particles which are each formed by bonding two or more polymers having different glass transition temperatures physically or chemically to each other, and is not made of a single phase consisting of a single polymer, such as a block polymer. Examples of the form of the complex include a core-shell structure, which is a spherical particle having a central portion and a shell portion which are made of different polymers each other; a side-by-side structure, which is a structure in which two or more polymers are arranged side by side; a potbellied structure, which is a structure in which a part of a polymer present at the center portion of a core-shell structure is uncovered with a shell portion thereof; and an octopus-like structure, which is a structure in which particles of a polymer are embedded in the surface of a particle of a different, spherical polymer so that the polymers are integrated with each other. Among these, the core-shell structure is preferred. The ratio between the core and the shell in the complex is not particularly limited. The ratio by weight of the core to the shell is usually from "20:80" to "99:1", preferably from "30:70" to "97:3", more preferably "40:60" to "95:5".

The complex having a core-shell structure can be produced by polymerizing a monomer mixture containing an acrylate monomer stepwise by emulsion polymerization or the like. Specifically, a method in which polymerizing a monomer for a core and then using this polymer as seed particles to polymerize a monomer for a shell is a typical production method and is preferred. In this case, it is allowable to polymerize a monomer for a core and then add thereto a monomer for a shell in the same reactor, thereby forming a core-shell structure, or use, as a core, seed particles formed in a reactor to polymerize a monomer for a shell in a different reactor, thereby forming a core-shell structure.

The polymerization conversion ratio of the core monomer in the polymerization reaction is usually 70% or more by weight, preferably 90% or more by weight. If the polymerization conversion ratio is too low, the complex is not easily caused to have any core-shell structure. Examples of the method for adding the shell monomer include: a method of adding the total amount of the monomer at a time and then polymerizing the monomer; a method of adding and polymerizing a part of the monomer and then adding the remainder thereof thereto continuously or intermittently, and a method of adding the monomer continuously from the time when the polymerization reaction for the shell is started. The polymerization conversion ratio of the shell monomer in the polymerization reaction is usually 70% or more by weight, preferably 90% or more by weight. About the polymerization temperature, the temperature for the polymerization for the core and that for the polymerization for the shell are each usually from 30 to 90° C., preferably from 50 to 80° C. The polymerization times are each usually from 2 to 10 hours.

The polymer (A) is preferably made of fine particles. When the polymer is made of fine particles, the particle diameter of the polymer (A) is usually from 10 to 1000 nm, preferably from 50 to 500 nm, more preferably from 80 to 200 nm. If the particle diameter is too large, in an electrode the binding force between its active material for an electrode and its current collector tends to be lower. On the other hand, if the particle diameter is too small, the binder covers up the surface of the active material for an electrode so that the internal resistance of the capacitor tends to increase. The particle diameter is the number-average particle diameter obtained by measuring diameters of 100 particles selected at random out of the polymer particles, in a transmission electron microscopic photograph thereof, and then calculating out the arithmetic average thereof.

(2) Composition for an electric double layer capacitor

The composition for an electric double layer capacitor (hereinafter referred to merely as the "composition" in some cases) of the invention comprises the above-mentioned binder and an active material for an electrode.

The active material for an electrode, which constitutes the composition of the invention, is an allotrope of carbon having fine pores capable of forming an electric double layer. The specific surface area thereof is 30 $m^2/g$ or more, more preferably from 500 to 5,000 $m^2/g$ or more, in particular preferably from 1,000 to 3,000 $m^2/g$ or more. Examples of such an allotrope of carbon is activated carbon, polyacene, carbon whisker, graphite or the like. Among these, activated carbon is preferred. This carbon is preferably in the form of powder or fiber. Examples of the type of activated carbon include a phenol type, a rayon type, an acrylic type, a pitch type and a coconut husk type. As the active material for an electrode, there can also be used non-porous carbon which has microcrystalline carbon similar to graphite, the interlayer distance of the microcrystalline carbon being enlarged. Such non-porous carbon can be obtained by subjecting carbon capable of being easily graphitized, in which microcrystal having a multilayered graphite structure is developed, to dry distillation at 700 to 850° C., subjecting the resultant together with caustic alkali to thermal treatment at 800 to 900° C. and optionally removing the remnant of the alkaline component. The particle diameter of the active material for an electrode is preferably from 0.1 to 100 µm, more preferably from 1 to 20 µm. When the particle diameter is within such a range, the electrode for an electric double layer capacitor can easily be made thin and the capacity density can also be made high. Thus, the case is preferred.

The amount of the binder in the composition of the invention is preferably from 0.1 to 20 parts by weight, more preferably from 0.5 to 10 parts by weight for 100 parts by weight of the active material for an electrode. If the binder amount is too small, the active material for an electrode or an optionally added electroconductivity additive falls off easily from the electrode. Conversely, if the amount is too large, the active material for an electrode is covered up with the binder to increase the internal resistance of the electrode.

In the composition of the invention, the content by percentage of alkali metal ions is preferably 0.2% or less by weight of the total of the binder (100% by weight). When the content by percentage of the alkali metal ions is small, corrosion of the current collector can be favorably prevented.

Preferably, the composition of the invention further contains an electroconductivity additive. The electroconductivity additive is an agent which contributes to a reduction in the internal resistance of the electric double layer capacitor and further a rise in the capacity density. Specific examples of the electroconductivity additive include carbon allotropies having electroconductivity and having no pores capable of forming an electric double layer, such as carbon black, KETJENBLACK (registered trademark of Ketjen Black International Corporation), acetylene black, carbon whisker, carbon fiber, natural graphite, and artificial graphite; and metal-containing electroconductivity additives such as particles made of titanium oxide, ruthenium oxide, aluminum, nickel or the like, and metal fiber. Among these, KETJENBLACK or acetylene black, which is a kind of carbon black, is preferred. The amount of the electroconductivity additive is usually from 0.1 to 20 parts by weight, preferably from 2 to 10 parts by weight for 100 parts by weight of the active material for an electrode. About the electroconductivity additive, it is preferred to mix the additive with the active material for an electrode and then use the mixture.

Preferably, the composition of the invention further contains a thickener. When the thickener is contained therein, the applying property or fluidity of the composition is improved. The kind of the thickener is not particularly limited, and the thickener is preferably a water-soluble polymer. Specific examples thereof include: cellulose-based polymers such as carboxymethyl cellulose, methylcellulose and hydroxypropyl cellulose, and ammonium salts and alkali metal salts thereof, poly acrylic or methacrylic acid salts such as sodium poly acrylate or methacrylate; polyvinyl alcohol, polyethylene oxide, polyvinyl pyrrolidone, copolymer made from acrylic acid or an acrylic acid salt and vinyl alcohol; copolymer made from maleic anhydride, maleic acid or fumaric acid and vinyl alcohol, modified polyvinyl alcohol, modified polyacrylic acid, polyethylene glycol, polycarboxylic acid, oxidized starch, starch phosphate, casein, and various modified starches. Among these, cellulose-based polymers and salts thereof are preferred. Particularly preferred are ammonium salts of cellulose-based polymers. The amount of the thickener is preferably from 0.5 to 5 parts by weight of the active material for an electrode (100% by weight)

The composition of the invention may contain a small amount of any water-insoluble polymer other than the polymer (A) and the thickener as long as the effects of the invention are not spoiled. Examples of such a water-insoluble polymer include acrylonitrile/1-olefin copolymer; nitrile polymers such as acrylonitrile/butadiene rubber, and a hydrogenated product thereof; diene polymers such as polybutadiene, and styrene/butadiene copolymer; ethylene-based polymers such as polyethylene, ethylene/propylene/non-conjugated diene copolymer; and fluorocarbon polymers such as polyvinylidene fluoride, and polytetrafluoroethylene.

The composition of the invention may contain a solvent. Examples of the solvent include water and an organic solvent. Examples of the organic solvent include alkyl alcohols such as methyl alcohol, ethyl alcohol, and propyl alcohol; alkyl ketones such as acetone, and methyl ethyl ketone; ethers such as tetrahydrofuran, dioxane, and diglyme; amides such as diethylformamide, dimethylacetoamide, N-methyl-2-pyrrolidone (hereinafter referred to as NMP in some cases), and dimethylimidazolidinone; and sulfur-containing compound solvents such as dimethylsulfoxide, and sulfolane. When the composition of the invention is used in wet forming which will be described later, it is preferred that the composition contains water.

The composition of the invention can be obtained by mixing the binder of the invention, the active material for an electrode, and the optionally added electroconductivity additive by use of a mixer or the like. The mixer that can be used is a ball mill, a sand mill, a pigment disperser, a crusher, an ultrasonic wave disperser, a homogenizer, a planetary mixer, a Hobart mixer, or the like.

The method for the mixing or the order of the mixing is not particularly limited. Specifically, preferred is a method of mixing water with the electroconductivity additive to disperse the electroconductivity additive into the form of fine particles, adding thereto the active material for an electrode and a dispersion of the polymer (A), which is a binder dispersed in water (hereinafter referred to as the "water dispersion polymer (A)" in some cases), and then mixing the resultant homogeneously. Preferred is also a method of mixing the active material for an electrode firstly with the electroconductivity additive by use of a mixer such as a crusher, a planetary mixer, a Henschel mixer or an Omni mixer, adding water thereto, dispersing the active material for an electrode and the electroconductivity additive homogeneously, adding thereto the water dispersion polymer (A), and mixing the resultant homogeneously. About the water used for dispersing the electroconductivity additive in these methods, it is preferred to use water that a thickener is dissolved.

There can also be listed up a method of mixing the active material for an electrode with the electroconductivity additive by use of a mixer and spraying the water dispersion polymer (A) thereto during the mixing. These methods make it possible to yield a homogeneous composition easily. The water dispersion polymer (A) can easily be obtained by the above-mentioned emulsion polymerization or the like. If necessary, the concentration of solids therein can be adjusted by concentration, dilution or the like. The composition can also be obtained by yielding the polymer (A) in a solvent by solution polymerization or the like and then dispersing this in water by a phase inversing method.

The composition of the invention can be obtained by mixing the binder for an electric double layer capacitor, which comprises the polymer (A), and the active material for an electrode with each other in a solvent to yield a dispersion, and then granulating this dispersion.

The method for the granulation is not particularly limited. Examples thereof include spray drying granulation, tumbling granulation, compressing granulation, agitation granulation, extruding granulation, crushing granulation, fluidized-bed granulation, fluidized-bed hybridization granulation, and melting granulation. Among these, the spray drying granulation, tumbling granulation, agitation granulation, fluidized-bed granulation and fluidized-bed hybridization granulation are preferred since the use thereof gives highly homogeneous, spherical grains. The spray drying granulation is more preferred.

The spray drying granulation is a granulating method of mixing the active material for an electrode, the binder of the invention, and optional other components in a solvent to yield a dispersion, and then spraying the dispersion from an atomizer by use of a spray drier. This method is preferred since the sprayed dispersion is dried in a drying tower, thereby making it possible to yield spherical grains composed of the active material for an electrode, the binder and the other components contained in the dispersion. As the solvent that can be used in the preparation of the dispersion, there can be used the same "solvent" that is described in the above-mentioned item "Composition for an electric double layer capacitor" and may be contained in the composition of the invention. Water is preferred.

These solvents may be used alone or in combination of two or more thereof. The used amount thereof is adjusted to set the solid concentration therein usually into the range of 1 to 50% by weight, preferably into the range of 5 to 50% by weight, more preferably into the range of 10 to 30% by weight. When the solid concentration is within the range, the dispersibility of the binder is favorably made very high.

A dispersing agent may be used together with the solvent. The dispersing agent that can be used in the invention has an effect of improving homogeneous dispersibility of the active material for an electrode, the binder and so on. The agent may or may not have binding force. When the solvent is water, a water-soluble dispersing agent is used, and examples thereof include the compounds described as the "thickener" in the above-mentioned item "Composition for an electric double layer capacitor", and chitin and chitosan derivatives. When the solvent is an organic solvent, an organic solvent soluble dispersing agent is used, and examples thereof include the compounds described as the "water-insoluble polymer" in the item "Composition for an electric double layer capacitor".

The dispersing agent is appropriately selected in accordance with the kind of the solvent, and is preferably the water-soluble dispersing agent, more preferably a cellulose-based polymer, an ammonium salt thereof or an alkali metal salt thereof.

These dispersing agents may be used alone or in combination of two or more thereof. The blended amount of the dispersing agent(s) is not particularly limited, and is from 0 to 50 parts by weight, preferably from 0.1 to 10 parts by weight, more preferably from 0.5 to 5 parts by weight for 100 parts by weight of the active material for an electrode.

The mixing method used in the preparation of the above-mentioned dispersion is not particularly limited, and for example, a mixing machine can be used, examples of which include a ball mill, a sand mill, a pigment disperser, a crusher, an ultrasonic wave disperser, a homogenizer, and a planetary mixer. Conditions for the mixing are appropriately selected in accordance with the kind of the mixture. Usually, the mixing temperature is from room temperature to 80° C., and the mixing time is from 10 minutes to several hours.

The method for spraying the resultant dispersion is not particularly limited. For example, a generally used spray drying machine, which may be referred to as a spray drier, can be used. The spray drying machine is composed of a comminuting section, a drying section, and a powder collecting section. The comminuting section comprises a device (an atomizer) for comminuting the dispersion into the form of fine liquid drops, and spraying the drops into the drying section. The kind of the atomizer is roughly classified into a rotary disc system and a spray system. The two can be preferably used. According to the rotary disc system, raw dispersion is introduced to the central portion of a disc rotating at a high speed, and when the raw dispersion goes away from the disc, the dispersion becomes fine liquid drops. The rotating speed of the disc, which depends on the size of the disc, is usually from 5,000 to 30,000 rpm, preferably from 15,000 to 30,000 rpm. According to the spray system, a pressure is applied to the dispersion, thereby spraying the dispersion from a nozzle into the form of fine liquid drops. The temperature of the sprayed dispersion is usually from about 20 to 250° C. In the drying section, hot wind passes through the inside thereof, and the solvent in the liquid drops of the dispersion, which are made fine with an atomizer, is evaporated by the hot wind, and removed. Solid contents contained in the dispersion are dried and turned into spherical particles. The temperature of the hot wind is usually from 80 to 300° C., preferably from 100 to 200° C. The resultant spherical particles are collected in the powder collecting section. The particles obtained by this method are particles in which the active material for an electrode and the binder are well balanced, the particles having a substantially even spherical shape and particle diameter. The solid contents in the dispersion are aggregated by drying thereof. Thus, the bulk density of the electrode material is improved.

The tumbling granulation, agitation granulation, fluidized-bed granulation and fluidized-bed hybridization granulation are each a method of spraying the binder onto the active material for an electrode that are caused to flow forcibly, thereby preparing grains. The methods are different from each other in the method for causing the active material for an electrode to flow. In the tumbling granulation, the active material for an electrode and the optional other components are tumbled in a rotary container such as a rotary drum or a rotary tray. In the agitation granulation, fluidizing movement is forcibly given to raw powder with an agitating blade set up in a container. The fluidized-bed granulation is a method of floating and suspending powder into a fluid blowing up from below and keeping this state. The fluidized-bed hybridization granulation is a method of using the fluidized-bed granulation together with tumbling or agitating effect. The method for spraying the binder onto the flowing active material for an electrode is not particularly limited, and is preferably a method of atomizing a dispersion containing the binder thereon to. Thus, the aggregated and granulated composition of the invention, for an electric double layer capacitor, can be yielded. The temperature of the fluidized-bed which contains the active material for an electrode is usually from room temperature to 100° C., and the dispersion is sprayed usually at 50 to 250° C.

In the case of using one or more additional components, such as the electroconductivity additive or the dispersing agent, in these granulation methods, these may be fluidized together with the active material for an electrode or may be sprayed onto the active material for an electrode, together with the binder. When the additional component(s) is/are fluidized together with the active material for an electrode, the additive component(s), such as the electroconductivity additive, may be caused to adhere beforehand onto the surface of the active material for an electrode. This case is preferred since the materials, which have different specific gravities, can be homogeneously dispersed in each other. The method for causing the electroconductivity additive or the like to adhere onto the surface of the active material for an electrode is, for example, mechanochemical treatment of mixing the active material for an electrode with the electroconductivity additive or the like while a mechanical force such as compressing force or shearing force is applied thereto. As a machine for conducting the mechanochemical treatment, the following may be used: a kneader such as a compressing kneader or a biaxial roll; a high-speed impact dry-powder hybridization machine such as a rotary ball mill or a hybridization system (manufactured by NARA MACHINERY CO., LTD.); a compression shearing dry-powder hybridization machine such as a mechanofusion system (manufactured by Hosokawa Micron Group); or the like. In the case of spraying the additional component(s) together with the binder, it is possible to mixing, for example, the binder, the electroconductivity additive, and the dispersing agent homogeneously in a solvent and spray the resultant dispersion onto a fluidized-bed of the active material for an electrode, thereby forming grains.

In the composition, for an electric double layer capacitor, granulated in these methods, the dispersibility of the active material for an electrode and the binder is improved. The improvement in the dispersibility makes it possible to reduce the amount of the binder contained in an electrode for an electric double layer capacitor. Thus, an electrode for an electric double layer capacitor can be produced which makes it possible to produce a capacitor having a low internal resistance and a high electrostatic capacity.

(3) Electrode for an electric double layer capacitor

The electrode for an electric double layer capacitor of the invention is an electrode in which the composition of the invention is layered on a current collector.

The current collector is not particularly limited if it is a material having electroconductivity and electrochemically endurance. Preferred is a metallic material such as aluminum, titanium, tantalum, stainless steel, gold, or platinum since the material has heat resistance. Aluminum and platinum are particularly preferred. The shape of the current collector is not particularly limited. Usually, a product in the form of a sheet having a thickness of about 0.001 to 0.5 mm is used.

The electrode for an electric double layer capacitor of the invention can be produced by wet-forming or dry-forming the composition for an electric double layer capacitor. For the wet-forming, an applying method can be preferably used, in which the composition of the invention which contains water is applied onto the current collector and then the applied composition is dried, thereby producing the electrode. The method for applying the composition onto the current collector is not particularly limited. Examples thereof include a doctor blade method, a dipping method, a reverse roll method, a direct roll method, a gravure method, an extrusion method and a brush painting method. The viscosity of the composition is varied in accordance with the kind of the applicator or the shape of applicating lines, and is usually from 100 to 100,000 mpa·s, preferably from 1,000 to 50,000 mPa·s, more preferably from 5,000 to 20,000 mPa·s.

The applying amount of the composition is not particularly limited. The amount is such an amount that the thickness of the applied and dried film (hereinafter referred to as the "electrode layer" in some cases) on the current collector is made preferably into the range of 0.005 to 5 mm, more preferably into the range of 0.01 to 2 mm. The method for the drying may be, for example, drying with warm wind, hot wind or low humidity wind, vacuum drying, or drying by irradiation with (far) infrared rays, electron beams or the like. The temperature for the drying is usually from 150 to 250° C. After the drying, the electrode may be pressed so that the density of the active material in the electrode layer can be raised. Examples of the method for the pressing include mold pressing, and roll pressing.

The electrode-producing method based on the dry-forming is preferred since no drying step is necessary so that the production costs can be reduced. Examples of the dry-forming include press-molding of filling the composition of the invention into a mold or spraying the composition uniformly into a planar form, and pressing the composition to rearrange, deform or break the composition, thereby making the composition dense and forming the electrode layer; and extrusion-molding of forming the electrode layer continuously into an endless long product such as a film or sheet, the molding being also called paste extrusion since the composition is turned into a paste form when the composition is extruded from a forming machine. Among these, the press-molding is preferably used since the molding can be performed in simple facilities.

In order to use the composition of the invention to perform press-molding, the composition of the invention granulated by means of, for example, a feeder is sprayed onto the current collector and then a pressing machine is used to perform the press-molding. Alternatively, the electrode layer can be continuously formed by using a feeder to supply the composition quantitatively onto the current collector and then pressing the composition with rollers or the like. Even when the composition having powder form is used, a small amount of a forming auxiliary such as water or an alcohol may be added thereto at the time of the molding. It is preferred that the temperature at the time of the molding is usually from 0 to 200° C. and the molding is performed at the temperature not less than 20° C. higher than the highest glass transition temperature out of two or more glass transition temperatures that the polymer (A) has.

In order to even a scattering in the thickness of the molded electrode and raise the density of the electrode layer to make the capacity high, further pressing may be performed if necessary after the press-molding. The method for the post-molding pressing is generally through the step of pressing by means of rolls. In the pressing step, two columnar rolls are arranged above and below in parallel to each other at a small interval, the rolls are rotated in directions reverse to each other, and the electrodes are put into a gap therebetween and then pressed. The rolls may be subjected to heating, cooling or temperature-adjustment.

(4) Electric double layer capacitor

The electric double layer capacitor of the invention is a capacitor having the above-mentioned the electrode for an electric double layer capacitor, an electrolytic solution, and a separator. The electric double layer capacitor can be produced by using this electrode, an electrolytic solution, and members such as a separator in a usual way. Specifically, for example, the capacitor can be produced by cutting the electrode for an electric double layer capacitor into pieces of an appropriate size, stacking the electrodes to interpose a separator therebetween, winding or folding this in accordance with the capacitor shape, putting the resultant into a container, injecting an electrolytic solution into the container, and then sealing up the container.

The electrolytic solution is not particularly limited, and is preferably a non-aqueous electrolytic solution in which an electrolyte is dissolved in an organic solvent. The electrolyte that can be used may be any electrolyte known in the prior art. Examples thereof include tetraethylammonium tetrafluoroborate, triethylmonomethylammonium tetrafluoroborate, and tetraethylammonium hexafluorophosphate.

The solvent in which these electrolytes are dissolved (electrolytic solution solvent) is not particularly limited if the solvent is generally used as an electrolytic solution solvent. Specific examples thereof include carbonates such as propylene carbonate, ethylene carbonate, and butylene carbonate; lactones such as γ-butyrolactone; sulfolanes; and nitrites such as acetonitrile. These may be used alone or in the form of a mixed solvent of two or more thereof. Among these, carbonates are preferred. The concentration of the electrolytic solution is usually 0.5 mol/L or more, preferably 0.8 mol/L or more.

As the separator, the following can be used:
a microporous membrane made of a polyolefin such as polyethylene or polypropylene; a nonwoven cloth made of a polyolefin or rayon; or a porous membrane made mainly of pulp, which is generally called electrolytic condenser paper. Instead of the separator, a solid electrolyte or a gel electrolyte may be used.

EXAMPLES

The invention will be more specifically described by way of the following working examples and comparative examples. However, the invention is not limited to the working examples. Unless otherwise specified, a part or parts and % in the examples are those by weight.

(Production of a Water Dispersion Polymer Containing a Binder)

Example 1

Into a reactor equipped with a mechanical stirrer and a condenser were charged 674.9 parts of deionized water, 7.1 parts of a 28% solution of sodium laurylsulfate in water, and 0.8 part of trisodium polyphosphate in the atmosphere of nitrogen, and the resultant was heated to 75° C. while stirred. To the reactor were added 82 parts of a 2.44% solution of ammonium persulfate in water. Next, a monomer (1-1) described in Table 1 was added to the reactor at a constant rate over 2 hours, and caused to react until the polymerization conversion ratio became 98%. About the resultant polymer, the particle diameter (the first stage particle diameter) thereof was measured by a method described below.

Subsequently, a monomer (1-2) was added to the reactor at a constant rate over 2 hours. After the end of the addition, reaction was continued for 3 hours while the temperature for the reaction was kept at 80° C., so as to yield a water dispersion polymer (1A) containing a binder made of the polymer (1A). The polymerization conversion ratio was 99% of all the monomer. The composition ratio of the polymer (1A) was consistent with the charge ratio between the monomers. About the resultant polymer (1A), the particle diameter (the final particle diameter) thereof was measured by the method described below. The solid concentration in the water dispersion polymer (1A) was 40%. About the polymer (1A), the glass transition temperature (Tg) thereof was measured by a method described below. The results are shown in Table 1.

Example 2, Example 3 and Comparative Example 1

Water dispersion polymers (2A), (3A) and (4A) each having a solid concentration of 40% were respectively yielded in the same way as in Example 1 except that instead of the monomer (1-1), a monomer (2-1), (3-1) or (4-1) was used and instead of the monomer (1-2), a monomer (2-2), (3-2) or (4-2) was used. The glass transition temperature and the particle diameters (the first stage particle diameter and the final particle diameter) of each of them were measured by the methods described below. The results are shown in Table 1.

Comparative Example 2

Into a reactor equipped with a mechanical stirrer and a condenser were charged 674.9 parts of deionized water, 7.1 parts of a 28% solution of sodium laurylsulfate in water, and 0.8 part of trisodium polyphosphate in the atmosphere of nitrogen, and the resultant was heated to 75° C. while stirred. To the reactor were added 82 parts of a 2.44% solution of ammonium persulfate in water. Next, a monomer (5-1) described in Table 1 was added to the reactor at a constant rate over 2 hours, and caused to react until the polymerization conversion ratio became 98%, so as to yield a water dispersion polymer (1B) having a solid concentration of 40%. Furthermore, a water dispersion polymer (2B) having a solid concentration of 40% was yielded in the same way as in the production of the water dispersion polymer (1B) except that a monomer (5-2) was used instead of the monomer (5-1). Next, the resultant water dispersion polymer (1B) and water dispersion polymer (2B) were mixed with each other to be set at the ratio by weight of 1:1, so as to yield a water dispersion polymer (1B+2B) containing the polymer (1B) and the polymer (2B). The glass transition temperature and the particle diameters (the final particle diameter) of each of them were measured by the methods described below. The results are shown in Table 1.

(Methods for Evaluating the Polymers and the Water Dispersion Polymers)

About each of the produced polymers and water dispersion polymers, tests and evaluations were made by the following methods.

<Composition of the Polymer>

The content (composition ratio) of each of the monomer units in the polymer was measured by $^1$H- and $^{13}$C-NMR.

<Particle Diameter of the Polymer>

The diameters of 100 particles selected at random out of particles of the polymer, in a transmission electron microscopic photograph thereof, were measured, and then the particle diameter of the polymer was obtained as the number-average particle diameter calculated out as the arithmetic average of the diameters.

<Glass Transition Temperature of the Polymer>

The glass transition temperature was measured using a differential scanning calorimeter (DSC) while the temperature was raised at 5° C. per minute.

<Evaluation of the Water Dispersion Polymers: CV Value (Electrochemical Stability)>

Acetylene black (powdery Denka Black, manufactured by DENKI KAGAKU KOGYO KABUSHIKI KAISHA), the water dispersion polymers, and an ammonium salt of carboxymethylcellulose (CMC Daicel DN-10L, manufactured by Daicel Chemical Industries, Ltd.) were mixed to be set at the ratio by weight of solid contents among acetylene black, the water dispersion polymer, and the ammonium salt of carboxymethylcellulose into 70:28:2, thereby yielding a homogeneous composition. The composition was applied evenly to an aluminum foil (thickness: 20 μm) by a doctor blade method, dried at 120° C. for 40 minutes, further dried at 120° C. under a reduced pressure of 0.6 kPa for 2 hours, and next compressed with a biaxial roll press so as to yield an electrode. This electrode was cut to yield a 0.5 cm×0.5 cm rectangular electrode. A wire made of stainless steel was welded to the aluminum foil of this rectangular electrode, and the resultant was vacuum-dried at 120° C. for 2 hours. The stainless steel wire was covered with a Teflon (registered trademark) seal tape in order to prevent the wire from contacting any electrolytic solution. In this way, a working electrode was yielded.

On the other hand, a nickel mesh to which a wire made of stainless steel was welded was wrapped with a 3 cm×1.5 cm lithium foil. The stainless steel wire was covered with a Teflon (registered trademark) seal tape in order to prevent the wire from contacting any electrolytic solution. In this way, a counter electrode was yielded. Furthermore, a nickel mesh to which a wire made of stainless steel was welded was wrapped with a 1 cm×1 cm lithium foil. The stainless steel wire was covered with a Teflon (registered trademark) seal tape in order to prevent the wire from contacting any electrolytic solution. In this way, a reference electrode was yielded.

The working electrode, the counter electrode and the reference electrode were used to form a three-electrode beaker cell. At 60° C., sweeping was repeated at a sweeping rate of 5 mV/second within a voltage range from 3 to 5 V so as to measure the CV value. The electrolytic solution used was a solution in which tetraethylammonium tetrafluoroborate was dissolved in propylene carbonate at a concentration of 1 mol/L. Fabrication of the cell and the measurement were carried out in a vacuum glove box purged with argon. About data, the current value at 4.6 V in the second cycle was read out. The current value in Comparative Example 1 was regarded as 100, and a value relative thereto is shown in Table 1. As the current value is larger, the oxidization resistance is smaller so that the electrochemical stability is poorer.

electrode layer was 0.6 g/cm$^3$. This electrode was evaluated based on criteria described below. Results of the evaluation are shown in Table 2.

Example 5

An electrode 80 μm in thickness in which the density of an electrode layer was 0.6 g/cm$^3$ was yielded in the same way as in Example 4 except that the water dispersion polymer (2A)

TABLE 1

| | | Monomers (each number: a part or parts by weight) | Tg (° C.) | First stage particle diameter (nm) | Final particle diameter (nm) | CV value |
|---|---|---|---|---|---|---|
| Example 1 | 1-1 | EHA40/ST8.5/EDMA2 | −60 | 90 | 110 | 47 |
| | 1-2 | BA19/MMA27/EDMA1.5/MAA2 | 20 | | | |
| Example 2 | 2-1 | EHA30/ST18.5/EDMA1.5 | −40 | 80 | 100 | 53 |
| | 2-2 | BA15/MMA20/ST11.5/EDMA1.5/MMA2 | 35 | | | |
| Example 3 | 3-1 | EHA24.3/ST24.3/EDMA1.5 | −25 | 80 | 100 | 81 |
| | 3-2 | AB15/MMA20/ST11.5/EDMA1.5/MAA2 | 35 | | | |
| Comparative Example 1 | 4-1 | BD16.5/ST18/MMA15/IA0.5/MSD0.05/DM0.1 | 30 | 130 | 160 | 100 |
| | 4-2 | BD5/BA2/MMA9/ST32.5/AA0.5/IA1/MSD0.1/DM0.05 | | | | |
| Comparative Example 2 | 5-1 | EHA80/ST16/EDMA4 | −60 | — | 90 | 49 |
| | 5-2 | BA38/MMA54/DEMA4/MAA4 | 20 | — | 100 | |

EHA: 2-ethylhexyl acrylate
BD: butadiene
ST: styrene
EDMA: ethylene glycol dimethacrylate
MMA: methyl methacrylate
MAA: methacrylic acid
BA: butyl acrylate
IA: itaconic acid
AA: acrylic acid
MSD: α-methylstyrene dimer (molecular weight adjustor)
DM: t-dodecylmercaptan (molecular weight adjustor)

(Production of Electrodes)

Example 4

The following were mixed: 100 parts of high-purity activated carbon powder having a specific surface area of 2000 m$^2$/g and an average particle diameter of 5 μm as an active material for an electrode; 1.5 parts of KETJENBLACK (manufactured by Ketjen Black International Corporation) as an electroconductivity additive; and 3 parts of acetylene black (powdery Denka Black, manufactured by DENKI KAGAKU KOGYO KABUSHIKI KAISHA). The mixture was added to 12.5 parts of the water dispersion polymer (1A) produced in Example 1, and further thereto were added 2 parts of an ammonium salt of carboxymethylcellulose (CMC Daicel DN-10L) as a thickener. Thereto was added water to set the concentration of solids therein to 43%. The components therein were mixed by use of a planetary mixer for 60 minutes. Thereafter, the resultant was diluted with water to set the concentration of all solids therein to 41%. The components therein were further mixed for 10 minutes to yield a homogeneous composition. A doctor blade was used to apply this composition onto an aluminum foil having a thickness of 20 μm, and then the composition was dried at 80° C. by means of a fan drying machine for 30 minutes. Thereafter, a roll pressing machine was used to press the resultant, thereby yielding an electrode 80 μm in thickness in which the density of an electrode layer was 0.6 g/cm$^3$. This electrode was evaluated based on criteria described below. Results of the evaluation are shown in Table 2.

produced in Example 2 was used. This electrode was evaluated based on the criteria described below. Results of the evaluation are shown in Table 2.

Example 6

An electrode 80 μm in thickness in which the density of an electrode layer was 0.6 g/cm$^3$ was yielded in the same way as in Example 4 except that the water dispersion polymer (3A) produced in Example 3 was used. This electrode was evaluated based on the criteria described below. Results of the evaluation are shown in Table 2.

Comparative Example 3

An electrode 80 μm in thickness in which the density of an electrode layer was 0.6 g/cm$^3$ was yielded in the same way as in Example 4 except that the water dispersion polymer (4A) produced in Comparative Example 1 was used. This electrode was evaluated based on the criteria described below. Results of the evaluation are shown in Table 2.

Comparative Example 4

An electrode 80 μm in thickness in which the density of an electrode layer was 0.6 g/cm$^3$ was yielded in the same way as in Example 4 except that the water dispersion polymer (1B+

2B) produced in Comparative Example 2 was used. This electrode was evaluated based on the criteria described below. Results of the evaluation are shown in Table 2.

Example 7

In a kneader, 100 parts of acetylene black (powdery Denka Black, manufactured by DENKI KAGAKU KOGYO KABUSHIKI KAISHA) and 40 parts of a 10% solution of carboxymethylcellolose in water (Celogen 7H, manufactured by DAI-ICHI KOGYO SEIYAKU CO., LTD.) were kneaded. The resultant was diluted with water to yield an electroconductivity additive dispersion.

In a kneader, the following were mixed: 75 parts of high-purity activated carbon powder having a specific surface area of 2000 $m^2/g$ and an average particle diameter of 5 µm; 16.7 parts of the electroconductivity additive dispersion; 12.5 parts of a carboxy-modified styrene-butadiene copolymer rubber latex (solid concentration: 40%, and particle diameter: 0.12 µm); and 15 parts of powder obtained by spray-drying the water dispersion polymer (1A) produced in Example 1. The resultant was dried under reduced pressure to yield a powdery mixture. The spray-drying is a method of spraying a dispersion, thereby drying solids therein.

The resultant powdery mixture was sprayed onto an aluminum current collector 40 µm in thickness, and then a blade was used to make the thickness of particles on the current collector even. Thereafter, the resultant was pressure-formed by use of a batch-type pressure forming machine (a desktop test press, model 2-S, manufactured by TESTER SANGYO CO., LTD.) at 150° C. and a pressure of 0.2 MPa for 1 minute, so as to yield an electrode 150 µm in thickness. The electrode was evaluated based on the criteria described below. Results of the evaluation are shown in Table 3.

Example 8

The following were mixed in a planetary mixer: 100 parts of activated carbon powder having a specific surface area of 2000 $m^2/g$ and an average particle diameter of 5 µm as an active material for an electrode; 15 parts of the water dispersion polymer (1A) obtained in Example 1 as a binder; 5 parts of acetylene black having an average particle diameter of 0.7 µm (powdery Denka Black, manufactured by DENKI KAGAKU KOGYO KABUSHIKI KAISHA) as an electroconductivity additive; 40 parts of an aqueous solution containing 5% of carboxymethylcellulose (DN-800H, manufactured by Daicel Chemical Industries, Ltd.) as a dispersing agent; and water. In this way, a mixed solution was yielded. This mixed solution was adjusted with water to set the solid concentration therein to 21%, and a spray drier (OC-16, manufactured by OHKAWARA KAKOHKI. CO., LTD.) was used to conduct spray granulation in the state that the rotary number of its rotary disc system atomizer (diameter: 65 mm) was set to 20,000 rpm, the temperature of hot wind was set to 150° C. and the temperature of its particle-collecting outlet was set to 90° C. In this way, a spherical electrode material was yielded.

The resultant electrode material was sprayed onto an aluminum current collector 40 µm in thickness, and a blade was used to make the thickness of particles on the current collector even. Thereafter, the resultant was pressure-formed by use of a batch-type pressure forming machine (a desktop test press, model 2-S, manufactured by TESTER SANGYO CO., LTD.) at 150° C. and a pressure of 0.2 MPa for 1 minute, so as to yield an electrode 150 µm in thickness. The electrode was evaluated based on the criteria described below. Results of the evaluation are shown in Table 3.

Comparative Example 5

An electrode material was yielded in the same way as in Example 7 except that the water dispersion polymer (4A) prepared in Comparative Example 1 was used instead of the water dispersion polymer (1A) prepared in Example 1.

The resultant electrode material was sprayed onto an aluminum current collector 40 µm in thickness, and a blade was used to make the thickness of particles on the current collector even. Thereafter, the resultant was pressure-formed by use of a batch-type pressure forming machine (a desktop test press, model 2-S, manufactured by TESTER SANGYO CO., LTD.) at 150° C. and a pressure of 0.2 MPa for 1 minute, so as to yield an electrode 150 µm in thickness. The electrode was evaluated based on the criteria described below. Results of the evaluation are shown in Table 3.

(Method for Evaluating the Electrodes)

<Peel Strength>

The resultant electrodes were each cut into a rectangle 2.5 cm wide and 10 cm long, and the resultant was fixed to direct the electrode layer face upward. An adhesive tape was caused to adhere onto the surface of the electrode layer, and then the adhesive tape was pulled in a 180° direction at a speed of 50 mm/minute to peel the electrode layer. The strength (N/cm) at this time was measured. The measurement was made 10 times, and the average of the measured values was obtained. It is demonstrated that as this value is larger, the peel strength is higher so that the active material for an electrode is less easily peeled from the current collector. The value is shown as a value relative to the peel strength of Comparative Example 1, which is regarded as 100.

<Heat Resistance>

The resultant electrodes were each allowed to stand still at 200° C. under a reduced pressure of 0.1 MPa for 50 hours. The peel strength thereof was then measured in the same manner as described above. The measured value is shown as a value relative to the peel strength of Comparative Example 3 before the standing at the reduced pressure and the high temperature, the peel strength being regarded as 100.

<Flexibility (1)>

About each of the electrodes of Examples 4 to 6 and Comparative Examples 3 to 4, the electrode after the standing under the reduced pressure and at the high temperature, which was formed to evaluate the heat resistance, was cut into rectangles 3 cm wide and 9 cm long. The cut electrodes were each put onto a desk to direct their face at the side of the electrode layer downwards. A rod made of stainless steel having a diameter of 3 mm was put on the face at the side of the current collector and at the center in the length direction (a position 4.5 cm apart from ends thereof), so as to be laid along the width direction. The rectangle electrode was bent at 180° around the stainless steel rod so as to direct the electrode layer outwards. It was observed whether or not the bent portion of the electrode layer was cracked or peeled. The matter that the electrode layer is not cracked or peeled demonstrates that the electrode is excellent in flexibility. The number of the rectangular electrodes about which this test was made was 10. Evaluation was made in accordance with the following criterion.

◯: In the 10 electrodes, a crack or peel was not generated at all.

x: One or more cracks or peels were generated in one or more out of the electrodes.

<Flexibility (2)>

About the electrodes of Examples 7 and 8, and Comparative Example 5, the flexibility thereof was measured in accordance with a method described in JIS K5600-5-1. The device used for the test was a device of type 1. While the diameter of its cylindrical mandrel was changed to 32, 25, 20, 16, 12 and 10 mm, tests were made. The electrodes were each observed with a loupe, and the diameter of the largest mandrel which caused a crack or peel was measured.

(Production of Electric Double Layer Capacitors)

From each of the electrodes obtained in Examples 4 to 8 and Comparative Examples 3 to 5, two electrodes having a diameter of 12 mm were punched out. The two electrodes are made opposite to each other, and therebetween a separator made of a rayon nonwoven cloth 35 μm in thickness was sandwiched. This was impregnated with an electrolytic solution in which triethylenemonomethylammonium tetrafluoroborate was dissolved in propylene carbonate at a concentration of 1.8 mol/L under reduced pressure, so as to form an electric double layer capacitor of coin cell CR2032 type. The capacitor formed by use of the electrodes was evaluated in accordance with criteria described below. The evaluation results are shown in Table 2 and 3.

(Methods for Evaluating the Electric Double Layer Capacitors)

<Electrostatic Capacity and Internal Resistance>

At 25° C., the resultant electric double layer capacitors were each charged up to 2.7 V at a constant current of 10 mA, and then charged up to a current of 0.5 mA at a constant voltage. Thereafter, the capacitor was discharged to 0 V at a constant current of 10 mA. By an energy conversion method, the electrostatic capacity at the time of the discharge was obtained. The resultant value was divided by the weight of the two electrode layers with the exception of the current collector, so as to give the electrostatic capacity per unit weight of the electrode layers. The internal resistance was calculated out from the value of the voltage drop at the time of the discharge in accordance with a calculating method in standard RC-2377 prescribed by Japan Electronics and Information Technology Industries Association.

TABLE 2

| | Peel strength | Heat resistance | Flexibility (1) | Electrostatic capacity | Internal resistance |
|---|---|---|---|---|---|
| Example 4 | 188 | 126 | o | 30.2 | 4.4 |
| Example 5 | 173 | 117 | o | 29.1 | 4.3 |
| Example 6 | 159 | 108 | o | 29.2 | 4.5 |
| Comparative Example 3 | 100 | 76 | x | 26.5 | 5.8 |
| Comparative Example 4 | 72 | 52 | x | 25.5 | 6.3 |

TABLE 3

| | Peel strength | Heat resistance | Flexibility (2) | Electrostatic capacity | Internal resistance |
|---|---|---|---|---|---|
| Example 7 | 144 | 101 | Neither crack nor peel at 10 mm. | 27.9 | 9.5 |
| Example 8 | 148 | 106 | Neither crack nor peel at 10 mm. | 29.5 | 8.4 |
| Comparative Example 5 | 97 | 66 | 20 mm | 25.8 | 11.5 |

The invention claimed is:

1. A binder for an electric double layer capacitor, comprising; a polymer (A),
   comprising 50% or more by weight of an acrylate monomer unit and 0.5 to 10% by weight of a polyfunctional unsaturated monomer unit, and
   having two or more glass transition temperatures.

2. The binder for the electric double layer capacitor according to claim 1, wherein the polymer (A) is a complex.

3. The binder for the electric double layer capacitor according to claim 2, wherein the complex is a fine particle having a core-shell structure obtained by polymerizing stepwise a monomer mixture comprising an acrylate monomer.

4. A composition for an electric double layer capacitor, comprising the binder as claimed in claim 1, and an active material for an electrode.

5. The composition for the electric double layer capacitor according to claim 4, further comprising an electroconductivity additive.

6. The composition for the electric double layer capacitor according to claim 4, further comprising water.

7. A method for producing the composition for an electric double layer capacitor as claimed in claim 4, wherein;
   mixing binder for an electric double layer capacitor comprising the polymer (A) and an active material for an electrode in a solvent to yield a dispersion, and
   granulating the dispersion by spray drying method.

8. An electrode for an electric double layer capacitor, wherein the composition for the electric double layer capacitor as claimed in claim 4 is stacked on a current collector.

9. A method for producing the electrode for the electric double layer capacitor as claimed in claim 8, comprising the steps of:
   applying, onto a current collector, a composition for an electric double layer capacitor comprising a binder for an electric double layer capacitor comprising the polymer (A), an active material for an electrode, and water, and;
   then drying the composition, thereby forming an electrode layer on the current collector.

10. A method for producing the electrode for an electric double layer capacitor as claimed in claim 8, comprising the steps of:
    dry-molding the composition for the electric double layer capacitor comprising the binder for the electric double layer capacitor comprising the polymer (A), and the active material for an electrode, and;
    then forming an electrode layer on the current collector.

11. An electric double layer capacitor, comprising the electrode as claimed in claim 8, an electrolytic solution, and a separator.

12. The binder for the electric double layer capacitor according to claim 1, wherein the polyfunctional unsaturated monomer is a dimethacrylate, a diacrylate, a divinyl compound, a non-conjugated diene, a trimethacrylate or a triacrylate.

* * * * *